United States Patent [19]

Frauenglass et al.

[11] 4,262,106
[45] Apr. 14, 1981

[54] HIGHLY STABLE ANAEROBIC COMPOSITIONS AND PROCESS FOR PREPARING THEM

[75] Inventors: Elliott Frauenglass, Newington; Jeremy W. Gorman, Simsbury, both of Conn.

[73] Assignee: Loctite Corporation, Newington, Conn.

[21] Appl. No.: 21,363

[22] Filed: Mar. 16, 1979

Related U.S. Application Data

[63] Continuation of Ser. No. 818,630, Jul. 25, 1977, abandoned, which is a continuation of Ser. No. 249,437, May 1, 1973, abandoned, which is a continuation of Ser. No. 2,953, Jan. 14, 1970, abandoned, which is a continuation-in-part of Ser. No. 796,572, Feb. 4, 1969, abandoned.

[51] Int. Cl.$^3$ ............................................. C08F 120/20
[52] U.S. Cl. ................................. 526/317; 526/77; 526/320; 526/323.1; 526/323.2; 526/328
[58] Field of Search .................. 526/323.1, 323.2, 317, 526/320, 328

[56] References Cited

U.S. PATENT DOCUMENTS

| | | | |
|---|---|---|---|
| 2,463,015 | 3/1949 | Bersworth | 260/419 |
| 2,474,411 | 6/1949 | Bersworth | 208/263 |
| 2,723,222 | 11/1955 | Stark | 196/24 |
| 2,917,477 | 12/1959 | Suen et al. | 526/303 |
| 3,046,262 | 7/1962 | Krieble | 526/320 |
| 3,141,869 | 7/1964 | Dennstedt | 526/328 |
| 3,435,012 | 3/1969 | Nordlander | 526/320 |

OTHER PUBLICATIONS

Sequestrene, Geigy Industrial Chemicals, (1952), pp. 1, 2 and 20.

*Primary Examiner*—Harry Wong, Jr.
*Attorney, Agent, or Firm*—J. Rodney Reck; Jean B. Mauro; Eugene F. Miller

[57] ABSTRACT

Polymerizable anaerobic compositions can be made more stable and capable of greater speed of cure by removing from the composition at least a substantial portion of the metal contamination.

2 Claims, No Drawings

HIGHLY STABLE ANAEROBIC COMPOSITIONS AND PROCESS FOR PREPARING THEM

CROSS REFERENCE TO RELATED APPLICATION

This application is a continuation of co-pending application U.S. Ser. No. 818,630, filed July 25, 1977, now abandoned, which is in turn a continuation of application Ser. No. 249,437, filed May 1, 1973, now abandoned, which was in turn a continuation of application Ser. No. 2,953, filed Jan. 14, 1970, now abandoned, which in turn was a continuation-in-part of application Ser. No. 796,572, filed Feb. 4, 1969, now abandoned.

BACKGROUND OF THE INVENTION

Polymerizable anaerobic compositions are precatalyzed polymerizable compositions which cure by a polymerization process which is inhibited by oxygen. As a result they remain in an unpolymerized state as long as adequate contact is maintained with air or other oxygen-bearing materials. Cure may be instituted by removing the composition from contact with oxygen. Since such oxygen free conditions can be found between closely fitting, non-porous surfaces, such as between interfitting metal parts, anaerobic compositions have found great utility in the adhesives and sealants fields.

The earliest anaerobic material is that disclosed in U.S. Pat. No. 2,628,178 to Burnett and Nordlander, issued Feb. 10, 1953. A more technically advanced and the first commercially important type of anaerobic composition is that disclosed in U.S. Pat. No. 2,895,950 to Krieble, issued July 21, 1959. Typical examples of disclosures relating to improved anaerobic compositions of this latter type may be found in the following U.S. Pat. Nos.: 3,043,820 to Krieble, issued July 10, 1962; 3,046,262 to Krieble, issued July 24, 1962; 3,218,305 to Krieble, issued Nov. 16, 1965; and 3,425,988 to Gorman and Toback, issued Feb. 4, 1969.

Improvements in the chemistry of anaerobic systems permitted the incorporation of polymerization accelerators which, while not destroying the stability of the composition over significant periods of time, such as six months or more, did provide increased speed of cure at the time of intended use. However, as more of the accelerator was added, or if a stronger accelerator was used, the incidence of spurious polymerization of the composition prior to the time of intended use increased. It also was found that these anaerobic compositions were far more sensitive to outside influences, such as temperature, and their performance was less predictable. For reasons not completely known, the number of compositions which would cure during processing or immediately after manufacture also increased.

In an attempt to solve these problems, larger amounts of conventional polymerization inhibitors (such as hydroquinone) were added to the anaerobic compositions. This tended to reduce speed of cure and did not solve the above mentioned stability problems. More powerful polymerization inhibitors were discovered, but were not found to be the complete solution to the problem. Even with these inhibitors, the stronger types of polymerization accelerators could not be used with safety, particularly at concentrations which would produce highly desirable speeds of cure.

It is the purpose of this invention to provide anaerobic compositions which can be formulated with increases in either or both stability and speed of cure, as well as to provide a process for producing anaerobic compositions having such capabilities.

THE INVENTION

This invention concerns anaerobic compositions having a reduced content of metal contamination. As used herein, "metal contamination" is intended to encompass metal which is present in any form within the anaerobic composition. The most common of these is metal which is present in the form of free metal ions. However, organic and inorganic metal compounds also commonly are included in such compositions as well. The presence of such contamination is traceable to impurities in the starting materials, generally due to their methods of manufacture, and on occasion traceable in part to contamination from the processing equipment in which the anaerobic composition is made. Metal contamination in the starting materials is by far the most troublesome source of contamination.

More specifically, one aspect of the invention concerns anaerobic compositions in which the iron content is less than 0.1 parts per million by weight, a level which was exceeded by prior art anaerobic compositions due to the inherent metal contamination in the starting materials as discussed above. While numerous metals contribute to the contamination, iron constitutes the bulk of such contaminants and if the iron content is reduced below the above level, significant increases in desirable properties are achieved. For optimum results, the iron content should be reduced to less than 0.05 parts per million by weight. Other common metal contaminants, such as copper, nickel and manganese, generally are removed in significant quantities along with the iron, although the efficiency with which a given metal contaminant is removed will vary to some extent with the specific method of removal, as is more fully discussed below.

The invention also contemplates anaerobic compositions prepared by a process which includes the step of reducing the content of metal contamination. The metal contamination may be removed from the final anaerobic composition or from starting materials or intermediates therefore. While significant improvements are achieved when any significant proportion of the metal contamination is removed, it commonly is desirable to remove at least 50 percent by weight of such metal contamination.

DESCRIPTION OF THE INVENTION AND ITS PREFERRED EMBODIMENTS

A. The Product

Anaerobic compositions which are the subject of the invention disclosed herein, are those which contain: (a) a free-radical polymerizable monomer whose polymerization is inhibited by the presence of oxygen; and (b) a redox activated latent initiator of free radical polymerization, which is capable of polymerizing the monomer of (a) above, in the absence of oxygen. This combination of ingredients can be place in an oxygen containing atmosphere such as a half filled bottle (preferrably polyethylene or other material which will permit penetration of atmospheric oxygen), and will remain in the liquid, unpolymerized state at normally encountered temperatures, such as 70° F. to 100° F., for a period of several months or longer.

As indicated above, this invention deals with anaerobic compositions wherein the latent initiator of free radical polymerization is redox activated. "Redox activated" refers to activation by a process which includes an oxidation-reduction reaction, wherein one of the products is or forms a free radical. The most important class of initiators in this category is the class of hydroperoxides. While applicants do not wish to be bound to any particular theory, it is believed that such initiators co-act with metal contamination to produce stability problems in the anaerobic composition, apparently by overcoming the inhibiting effect of the oxygen. It is quite surprising to find that the low levels of metal contamination which applicants find are inherent in the starting materials for anaerobic compositions could cause the significant problems which have been traced to such contamination. Even more surprising was the size of the increase in the performance of anaerobic products which is made possible by the removal of substantial amounts of this metal contamination.

While again not wishing to be bound by any particular theory, it is believed the metals which co-act with hydroperoxides to cause the stability problem discussed above are transition metals which have contiguous mutivalances (at least two available valance states which differ by only one number). This includes essentially all transition metals (those elements in classes 3b, 4b, 5b, 6b, 7b, 8b and 1b on the periodic chart). Examples of transition metals which do not have contiguous multivalances are platinum, gold, zirconium and hafnium. It appears that transition metal with contiguous multivalances combine with hydroperoxides to form a redox system frequently capable of initiating polymerization of the monomer in the anaerobic composition even in the presence of oxygen.

The most desirable monomers for use in anaerobic systems are polymerizable acrylate esters. When used in the process of this invention, preferably at least a portion of the acrylate monomer is a di- or other polyacrylate ester. These poly-functional monomers produce cross-linked polymers, which serve as more effective and more durable sealants and adhesives, the most common uses for the anaerobic compositions.

The most highly preferred acrylate esters which can be used in the compositions disclosed herein are polyacrylate esters which have the following general formula:

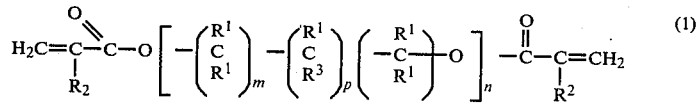
(1)

wherein $R^1$ represents a radical selected from the group consisting of hydrogen, lower alkyl of from 1 to about 4 carbon atoms, hydroxy alkyl of from 1 to about 4 carbon atoms, and

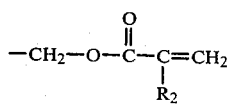

$R^2$ is a radical selected from the group consisting of hydrogen, halogen, and lower alkyl of from 1 to about 4 carbon atoms; $R^3$ is a radical selected from the group consisting of hydrogen, hydroxyl, and

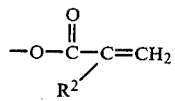

m is an integer equal to at least 1, e.g., from 1 to about 15 or higher, and preferrably from 1 to about 8 inclusive; n is an integer equal to at least 1, e.g., 1 to about 20 or more, and preferrably between about 2 and about 6; and p is one of the following: 0, 1.

The polymerizable polyacrylate esters utilized in accordance with the invention and corresponding to the above general formula are exemplified by, but not restricted to, the following materials: di-, tri- and tetrethyleneglycol dimethacrylate; dipropyleneglycol dimethacrylate; polyethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; neopentylglycol diacrylate; and trimethylolpropane triacrylate.

While di- and other polyacrylate esters—and particularly the polyacrylate esters discribed in the preceding paragraphs—have been found particularly desirble, monofunctional acrylate esters (esters containing one acrylate group) also may be used. When dealing with monofunctional acrylate esters, it is preferrable to use an ester which has a relatively polar alcoholic moiety. Such materials are less volatile than low molecular weight alkyl esters and, more important, the polar group tends to provide intermolecular attraction in the cured polymer, thus producing a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Other acrylates can be used in the anaerobic compositions, such as the isocyanate-monoacrylate reaction products described in the above mentioned U.S. Pat. No. 3,425,988. However, when other acrylates are used, they preferably are used in combination with one or more members from either or both of the above described classes of polyacrylate and monoacrylate monomers. Most preferably, polyacrylates having the chemical formula (1), given above, comprise at least about fifty percent by weight of the acrylates used since these monomers have been found clearly superior in anaerobic sealants, as is more fully described below.

An indicated above the anaerobic compositions as discussed herein are prepared by mixing a hydroperoxide catalyst with one or more acrylate esters as described above. Hydrogen-peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexl peroxide and t-butyl perbenzoate, respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferrably is an alkyl, aryl or aralkyl hydrocarbon group containing from about 3 to about 12 carbon atoms. Naturally $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the general formula (1) above. The organic hydroperoxide initiators which are used commonly comprise less than about 10 percent by weight of the combination of polymerizable monomer and initiator, since above that level adverse effects on the strength and durability of the cured composition may be experienced. Preferrably the hydroperoxide initiator comprises fromm about 0.1 percent to about 5 percent by weight of the combination.

Other materials can be added to the mixture of polymerizable monomer and latent polymerization initiator, such as quinone or polyhydric phenol stabilizers, thickeners, plasticizers, dyes, adhesive agents, thixotropic agents, etc. Such materials can be used in such combinations and proportions as is desired, provided they do not affect adversely the anaerobic nature of the composition. These materials generally do not comprise more than about 50 percent by weight of the total composition, and preferrably not more than about 20 percent by weight of the composition.

While the benefits of this invention are achievable in all anaerobic compositions in the form of increased stability, they are seen most clearly in anaerobic compositions which contain polymerization accelerators. As explained above, such accelerators should be incorporated in the composition to obtain rapid cure at the time of intended use. This avoids the need to add accelerators either to the anaerobic composition or the surfaces to be bonded, sealed, etc., at the time of use.

The most efficient of the polymerization accelerators are those which are redox activated. These frequently create stability problems when used to prepare anaerobic compositions in the prior art fashion because of the presence of metal contamination as discussed above. When used as disclosed herein, the redox activated accelerators can be used safely, and even can be used at higher levels to produce greater speed of cure. It is in this respect that some of the most important advantages of this invention are realized.

In addition, the removal of metal contamination permits increased speed of cure in another respect. Free radical inhibitors, such as those of the quinone-type, did not have a measureable effect on the speed of cure by less sophisticated accelerators, but such has not been found to be the case when dealing with the more sophisticated accelerator systems, such as those disclosed in the above mentioned U.S. Pat. No. 3,218,305. When metal contamination is removed, the inhibitor level can be reduced safely from the customary 100 to 300 parts per million by weight to about 25 to about 75 parts per million by weight. In many cases, the inhibitor can be eliminated totally. This reduction or elimination produces significant improvements in speed of cure.

The most common of the polymerization accelerators suitable for incorporation in anaerobic composition are discussed below and the benefits of the invention are achievable with any of such accelerators. It should be noted however that large numbers of polymerization accelerators are known in the art, and the broad concept of this invention is intended to encompass any polymerization accelerator which can be incorporated in the anaerobic composition without destroying the essential characteristics of such composition.

Among the earliest of the polymerization accelerators used in anaerobic composition were amines. The most commonly used are tertiary amines such as tributylamine and triethylamine. Essentially the entire class of tertiary amines can be used in such compositions, and the class may be broadly represented by the formula $$NR^5R^6R^7 \qquad (2)$$

wherein each of $R^5$, $R^6$ and $R^7$ is a hydrocarbon group containing up to about ten carbon atoms. Naturally the hydrocarbon groups can contain any substituent or linkage which does not adversely affect the workability of the amine to perform its intended function. Preferably, each of $R^5$, $R^6$ and $R^7$ is an alkyl, aryl or aralkyl group containing up to about 8 carbon atoms. The N,N-dialkyl aryl amines are particularly effective.

Certain secondary amines also can be used as accelerators, but care must be utilized in the selection of secondary amines since they are potent accelerators. They frequently can cause stability problems if used in too large an amount. The most desirable class of secondary amines has been found to be the class of heterocyclic secondary amines, particularly those amines wherein the heterocyclic ring is hydrogenated. Typical of such compounds are pyrrolidine, piperazine and 1,2,3,4-tetrahydroquinoline. Low levels of certain primary amines can be used in some cases, but rarely, if ever, can any advantage be shown over the other amines previously described.

Another highly successful class of accelerators is the organic sulfimides, i.e., organic compounds which contain the group

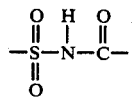

Because of the extreme effectiveness of the sulfimides as accelerators for anaerobic compositions, and because of the apparent strong interaction between the sulfimides and metal contamination, the use of the invention disclosed herein with anaerobic compositions containing organic sulfimides constitutes a highly preferred practice thereof. While the broad class of organic sulfimides can be used successfully, the sulfimides most commonly used can be represented by the formula

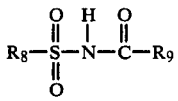

(3)

wherein each of $R_8$ and $R_9$ is a hydrocarbon group containing up to about ten carbon atoms, and preferrably up to about six carbon atoms. Naturally, $R_8$ and $R_9$ can contain any linkage or substituent which does not adversely affect the sulfimide for its intended use in the anaerobic composition. Further, $R_8$ and $R_9$ can be united to bond the sulfimide group in a heterocyclic ring, or a polynuclear heterocyclic ring system. Of the organic sulfimides, benzoic sulfimide has been found to be the most preferrable. A good combination of shelf stability and cure speed is obtainable with this class of accelerators, but care must be taken in combining sulfimides, particularly benzoic sulfimide, with amines of the types described above. Improper combinations can cause stability problems. However certain selected classes of amines can be used in combination with the sulfimides, and exceptionally good anaerobic compositions can be prepared. A preferred composition is that which contains a sulfimide, particularly benzoic sulfimide, in combination with either a heterocyclic secondary amine as discussed above, or a tertiary N,N-dialkyl aryl amine. Typical amines within the latter class may be represented by the following general formula:

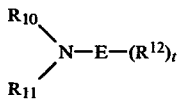

(4)

wherein E represents a carbocyclic aromatic nucleus selected from the group consisting of phenyl and naphthyl radicals; $R^{10}$ and $R^{11}$ are lower alkyl radicals of 1 to 4 carbon atoms; t is one of the following: 0, integer equal to from 1 to 5 inclusive; $R^{12}$ is a member selected from the groups of lower alkyl and lower alkoxy radicals of 1 to 4 carbon atoms inclusive, provided that when an $R^{10}$ radical is in the ortho position, t is greater than 1. For an expanded discussion of this type of system, reference is made to the above mentioned U.S. Pat. No. 3,218,305.

Other less active accelerators can be used in the compositions of this invention. Typical examples of such accelerators are succinimide, phthalmide and formamide.

Routine testing easily will determine the optimum amount of accelerator which can be incorporated in a given anaerobic composition. However the following general guide lines may be used. With regard to tertiary amines, large amounts may be used if desired, up to a maximum of about 5 percent by weight of the composition. Most preferrably these tertiary amine accelerators are used at from about 1 percent to about 4 percent by weight of the anaerobic composition. The succinimide, phthalimide and formamide accelerators also can be used in significant amounts, up to about 5 percent by weight of the composition, and preferrably from about 1 percent to about 5 percent by weight. The sulfimide and secondary amine accelerators generally are used at less than 2 percent by weight of the anaerobic composition. In the special case where a sulfimide is used in combination with a heterocyclic secondary amine or a N,N-dialkyl arylamine, the total of the two components should not exceed about 3 percent by weight of the anaerobic composition.

B. The Process

It will be apparent from the foregoing discussion, any process can be used which is capable of removing metal contamination at the extremely low concentrations at which it exists in anaerobic compositions, or in the starting materials, therefor. As indicated above, it has been found that the desirable properties described herein are obtained when the iron contamination in the anaerobic composition is less than that inherent in prior art anaerobic compositions, and hence the iron content should be reduced to a level less than about 0.10 parts per million by weight. Preferrably, this level is less than 0.05 parts per million, and optimum results are obtained at levels less than about 0.01 parts per million.

To accomplish the removal of metal contamination, the anaerobic composition, or at least a portion of the starting materials or intermediates therefore, are treated with an organic or inorganic compound which reacts with the metal of the metal contamination to form an insoluble metal containing precipitate. For purposes of this invention, the term insoluble metal-containing precipitate is used in its broad sense to cover chemical compounds and chemical complexes which are insoluble in the anaerobic composition.

Removal of the insoluble metal-containing precipitate may be by any conventional method. In many cases, allowing the insoluble precipitate to settle from the anaerobic composition will be adequate, even if the insoluble precipitate is not physically separated from the anaerobic composition. Preferably, physical separation is effected, and standard methods or removal of solids from liquids, such as decantation, filtration and centrifugation, may be used.

In a suitable process, the materials to be treated are passed through an ion exchange resin. Resins specifically designed for the removal of metal contamination, and particularly iron contamination, are available from a number of commercial sources. Because of the extremely low concentrations of metal contamination which are involved, extended colums of the resin should be used. Alternatively, the resin, in fine granules, can be mixed with the anaerobic materials or ingredients for a sufficient period of time to allow the metal to form an insoluble metal complex. A suitable ion exchange resin is that sold under the tradename "Dowex-50", a cationic resin of the sulfonate type, supported in a styrene-divinylbenzene matrix.

In another suitable process within the scope of the invention, the treatment agent is one which removes the metal contamination by complexing or adsorbing the metal onto its surface. A suitable treatment agent of this type is elemental sulfur.

An exceptionally good method of metal contamination removal within the scope of the invention described herein has been found to be the use of insoluble chelators. Unexpectedly, it was found that this process could be utilized to remove a large percentage of the extremely low concentration of metal contamination of the anaerobic composition, or the starting materials which are to be used in preparing such a composition. The use of insoluble chelators is a preferred embodiment of this invention.

As is well known in the art, chelating agents are compounds which bind available atoms into a ring structure via available electron pairs on the chelating agent. Typical examples of common chelating agents are beta diamines and and beta deketones; in these compounds the pair of nitrogen or oxygen atoms generally is separated by three carbon atoms. In this arrangement, the available electron pairs on the nitrogen or oxygen atoms are readily available for binding the metal atom into a six member, and hence quite stable, heterocyclic ring. With other chelating agents, rings may be formed having from five to seven atoms or twelve or more atoms.

For an expanded treatment of chelation and the chelating agents, reference is made to Dwyer and Mellor, "Chelating Agents and Metal Chelates", Academic Press, New York, 1964.

Generally, chelating agents are categorized by their "donor atoms", e.g., the atoms in the agent which "donate" electron pairs to bind the metal atom into the ring structure. The most common donor atoms in chelating agents are oxygen, nitrogen and sulfur. The most highly preferred chelating agents are those which utilize a nitrogen atom and an oxygen atom in forming the chelated ring structure. Examples of such chelating agents are ethylenediamine tetraacetic acid, o-aminophenol, and sodium salts of either of these.

Chelating agents other than those having one each of oxygen and nitrogen donor atoms can be used successfully. Typical examples of such compounds are the following: sodium acetylacetonate; polyvinyl alcohol; sodium dimethylglyoximate; sodium salicaldehyde; sodium diethyldithiocarbamate; disodium dithioxamidate; disodium pyrocatecholate; and sodium quinolinolate.

Still another class of treating agents which can be used in the process of this invention to remove metal contamination, is that class of compounds which will react with metal contamination to form metal salts which are insoluble in the anaerobic composition, or its starting materials, as the case may be. Typical treating agents of this class which can be used successfully are as follows: potassium ferricyanate; sodium citrate; sodium pyrophosphate; sodium silicate; disodium oxalate; phosphomolybdic acid; sodium cyanide; sodium stearate; tribasic sodium phosphate; and sodium sulfate.

The amount of treating agent, such as those described in the preceding paragraphs, which should be used to remove metal contamination from the anaerobic composition, or the starting materials therefore, easily can be determined with a minimum of routine testing. The optimum amount depends upon a large number of factors, such as the amount of metal contamination in the material, the percent removal required for the specific anaerobic composition involved, the time available over which chelation can take place, etc. In many cases it may be advantageous to use a combination of treating agents, particularly when dealing with chelating agents, or compounds used to form insoluble metal salts. Frequently, certain treating agents are particularly effective in removing certain metals, and hence a combination of agents may be more effective than any single one. As a general guideline, the minimum amount of insoluble treating agent which should be used is about 0.5% by weight of the materials to be treated; the maximum amount is about 10% by weight. Below this minimum, threatment time becomes unduly long, and above this maximum, little if any additional benefit is obtained. The preferred range is from about 1% to 5% treating agent by weight of the material to be treated.

In some cases, the amount of treating agent used can be materially reduced by performing the treatment step at a temperature at which the treating agent is at least slightly soluble in the material being treated, and allowing the reaction product of the treating agent and the metal contaminats to separate at a temperature at which the reaction product is insoluble.

In this case, concentrations of treating agents as low as about 50 to 100 parts per million by weight of the material to be treated can be used. A demonstration of this technique is presented in the examples below.

The amount of time required for the treatment process of this invention can be several days or more, or it can be reduced by, e.g., the use of large amounts of the chelating agent. It generally is undesirable under any processing conditions to mix the treating agent and the material to be treated for less than about one to two hours. Longer mixing times are desirable if the length of treatment time is not critical since the efficiency of removal of the metal contamination increases with treatment time. Treatment may proceed for up to several weeks if desired; excessive time may be wasteful or cumbersome, but will not adversely affect the process described herein.

As a practical matter, it is desirable to test the stability of the product when treatment is commenced, and check the stability from time to time thereafter until a pre-determined stability is reached. (A suitable test for stability is described fully in the Examples below.) At that time treatment may be stopped.

The temperature at which the treatment is conducted may vary over a relatively wide range. It has been found that the efficiency of the treatment process for metal removal increases with increasing temperature. Excessively high temperatures should be avoided however since the polymerizable monomers of the anaerobic composition will polymerize even in the most stable systems at elevated temperatures. Generally treatment at temperatures greater than about 160° F. is undesirable, particularly in the absence of vigorous agitation. Preferrably the temperature does not exceed about 150° F. At the other extreme, while the treatment may be conducted at low temperatures, such as about 30° F., it generally is impractical to perform the treatment at less than ambient temperature (e.g., 70° F.). Treatment at ambient temperature has been found to be perfectly suitable and, as a matter of convenience, frequently will be the most suitable temperature. Most preferrably the treatment is conducted between about 70° F. and about 150° F.

Since numerous possible components of anaerobic compositions are solids, it frequently is necessary to process the anaerobic composition as a whole, or to dissolve the solid component or components in a solvent for treatment. After the insoluble metal containing precipitate is separated, the solvent is removed by stripping or otherwise. Also, when viscous anaerobic compositions or components therefor are treated, it frequently is desirable to add sufficient solvent to reduce the viscosity to e.g., 1000 centipoises and preferably to about 500 centipoises, before commencing the treatment process.

When a suitable amount of the metal contamination has been separated from the anaerobic composition or the starting materials therefore, the treatment process is terminated. As indicated above, measurable benefits are obtained from the process described herein when any significant amount of metal contamination is removed.

Generally, at least about 50% by weight of the metal contamination should be removed, based on the total weight of metal contaminants in all ingredients used. Preferably at least about 80% by weight is removed, optimum results are achieved when at least about 95% by weight is removed.

The processing equipment which is used in the chelation process described herein should be constructed from passivated surfaces (surfaces which are essentially free of reactive metals, and particularly of those metals described herein as detrimental to anaerobic compositions). While certain grades of highly passivated stainless steel frequently can be used without substantial adverse effect, it is preferable for the appropriate surfaces to be coated with glass, epoxy, polyethylene, teflon, or other such non-metallic surface.

Upon completion of the processing described herein, the anaerobic compositions may be packaged in standard polyethylene bottles or other suitable containers, and are ready for use directly. If the starting materials for the anaerobic compositions are processed separately, the treated components simply need mixing prior to packaging and shipment.

EXAMPLES

The following Examples are given to demonstrate products and processes within the scope of the invention disclosed herein and are not intended to be limitations upon the invention. Unless stated to the contrary all ratios and percentages in the Examples are on a weight basis.

Standard Stability Test

Where the Examples contained herein make reference to the "stability" of a composition, the results of the following tests are involved. A standard 10 centimeter test tube is filled approximately half-full with a sample of the composition in question. The tube is then suspended in a constant temperature water bath which is maintained at 82° C. The length of time in minutes from the placing of the test tube in the bath to the time when the first solid or jelled material appears in the tube is noted. This length of time is used as a measure of the stability of the composition. It has been found that the relative stability as determined by this test reflects with reasonable accuracy the relative lengths of time for which the compositions may be stored at room temperature without spurious polymerization taking place. While a suitable stability for a given composition will vary some what from one composition to the next, the relative figures do give a sound basis for comparing related products.

EXAMPLE I

An approximate two pound sample of polyethyleneglycol dimethacrylate (average molecular weight=330) (hereinafter called "PEGMA") was separated into two approximately equal portions. To one of the portions was added 1 percent by weight ethylenediamine tetraacetic acid, and the mixture was agitated vigorously for one hour. The agitation was conducted in a 4 liter laboratory glass beaker by means of a laboratory agitator equipped with a teflon coated shaft and blade. After the agitation, the chelator was allowed to settle and the treated PEGMA was separated by decantation.

The treated and untreated portions of the PEGMA were used to prepare anaerobic compositions by adding to each 0.3 percent by weight dimethylparatoluidine, 0.4 percent by weight benzoic sulfimide, 3% by weight cumene hydroperoxide and 50 parts per million by weight quinone. The stability of each formulation then was determined and it was found that the anaerobic composition formulated from the untreated PEGMA was 4 minutes, whereas the composition formulated from the chelator-treated PEGMA was 12 minutes.

Fifty milliliters of each of the two anaerobic compositions were placed in separate polyethylene bottles and stored at room temperature. After two weeks it was found that the compositions prepared from untreated PEGMA had polymerized, whereas that prepared from the chelator-treated PEGMA was still liquid and had experienced no loss of stability.

EXAMPLE II

The process in Example I was repeated except that the disodium salt of ethylenediamine tetraacetic acid was used as a chelating agent at a concentration of 2 percent by weight of the material to be treated. The material treated was 94 percent by weight PEGMA, made slightly more viscous by the addition of 6 percent by weight of a polychlorophenol resin (ASTM E-28 softening point=208°-220° F.), sold under the trade name "Aroclor 5460". As in Example I, the mixing time was one hour. Upon completion of the mixing operation, the treated mixture was allowed to stand overnight to permit settling of the chelating agent, after which time the treated liquid was removed by decantation. The treated and untreated mixtures of PEGMA and polychlorophenol resin were used to prepare anaerobic compositions by the addition of the same ingredients, in the same concentrations, specified in Example I.

The stability of the two anaerobic compositions were determined and it was found that the composition prepared from the untreated material was 2 minutes, whereas that prepared from the chelator-treated material was 9 minutes.

EXAMPLE III

A two pound sample of PEGMA was mixed with 3 percent by weight cumene hydroperoxide and 100 parts per million by weight quinone. To this was added 4.3 percent by weight of the disodium salt ethylenediamine tetraacetic acid. The mixture was agitated as described in Example I above, for a period of 4 days. The mixture then was allowed to stand over night to permit settling of the chelator, following which the treated liquid was removed by decantation.

An anaerobic composition was prepared from this treated material by adding to it 0.3 percent by weight dimethylparatoluidine and 0.4 percent by weight benzoic sulfimide. The stability of this material was determined and found to be 12 minutes.

EXAMPLE IV

Approximately 50 cubic centimeters of dimethylparatoluidine was mixed with 5.6% by weight of the disodium salt of ethylenediamine tetraacetic acid, and agitated in a 250 cubic centimeter glass beaker for 48 hours. Approximately 50 cubic centimeters of cumene hydroperoxide were mixed with 5 percent by weight of the same chelating agent, and agitated in a second beaker for 16 hours. Approximately 50 cubic centimeters of PEGMA containing about 5 percent by weight of benzoic sulfimide were mixed with 5 percent of the same chelating agent and mixed in a third beaker for approximately 16 hours. All three treated materials were allowed to stand over night to permit settling of the chelating agents, following which the treated liquids were removed by decantation.

A sufficient amount of the PEGMA-benzoic sulfimide mixture was added to a portion of the chelator treated PEGMA from Example I to produce a benzoic sulfimide concentration in PEGMA of 0.4 percent by weight. To this was added 0.3 percent by weight of the dimethylparatoluidine treated in this Example, and 3 percent by weight of the cumene hydroperoxide, also treated in this Example. To the final mixture was added 100 parts per million by weight quinone.

The stability of this anaerobic composition then was determined and found to be 15 minutes.

EXAMPLE V

Ten percent by weight ethylenediamine tetraacetic acid was added to approximately 50 cubic centimeters of acrylic acid and the mixture was agitated for 2 hours, essentially as described in the above Examples. Thereafter the chelator was allowed to settle, and the chelator-treated liquid was removed by decantation.

Six percent by weight of the acrylic acid so treated was added to an anaerobic composition essentially identical to those described in Example I above (stability 11 minutes). The stability of the final mixture was tested and found to be 13 minutes.

To a second sample of the same anaerobic composition was added 6 percent by weight acrylic acid which had not been chelator-treated. The stability of this mixture was measured and found to be 4 minutes.

EXAMPLE VI

A polymerizable acrylate monomer was prepared by reacting two moles of hydroethylmethacrylate with 1 mole of the reaction product of 2 moles of toluene diisocyonate and 1 mole of hydrogenated diphenyldimethylmethane. 100 parts by weight of this monomer were mixed with 50 parts by weight dichloromethane and 15 parts by weight ethylenediamine tetraacetic acid. This mixture was agitated for 72 hours, essentially as described in the preceding Examples. After the chelator had settled, the liquid was removed by decantation and the dichloromethane was allowed to evaporate.

Six percent by weight of the treated acrylate monomer of the preceding paragraph was added to an anaerobic composition essentially identical to those described in Example I (stability 16 minutes). The stability of the final mixture was measured and found to be 19 minutes.

Six percent of the same acrylate monomer which had not been treated as described above in this Example, was added to a portion of the same anaerobic composition described in the preceding paragraph. The stability of this final mixture was measured and found to be eleven minutes.

EXAMPLE VII

An anaerobic composition essentially identical to those described in Example I, above, was prepared, except that the level of benzoic sulfimide was increased to 1.6% by weight. The composition immediately was mixed with 5% by weight of ethylenediamine tetraacetic acid and agitated for 18 days.

At the end of that period, the stability of the composition was found to be 60 minutes. Iron analysis indicated that the total iron content was less than 0.10 part per million by weight.

The speed of cure of this composition under anaerobic conditions was determined by using the composition as a nut and bolt sealant. The speed of cure was found to be substantially faster than any of the compositions prepared in Examples I through VI above.

EXAMPLE VIII

A sample of PEGMA was split into three portions. To the first portion was added ten percent by weight of elemental sulfur, and the mixture was agitated at room temperature for twenty hours. After the sulfur had settled, the treated PEGMA was separated by decantation.

To the second portion of the PEGMA was added ten percent by weight of an acid form cation exchange resin of the sulfonate type, sold under the tradename "Dowex 50 W". The mixture was agitated for twenty hours at 150° F., after which the temperature was allowed to return to room temperature and the ion exchange resin allowed to settle. The treated PEGMA was separated thereafter by decantation.

Three anaerobic formulations were prepared consisting of PEGMA containing three percent by weight cumene hydroperoxide, 0.2 percent by weight benzoic sulfimide, and 0.05 percent by weight dimethylparatoluidine. Formulation A was prepared from the untreated portion of PEGMA, Formulation B from the sulfur treated portion of PEGMA, and Formulation C from the ion exchange resin treated portion of PEGMA. The stabilities of the three Formulations were determined and found to be as follows:

| Formulation | Stability, Mins. |
| --- | --- |
| A | 8 |
| B | 75 |
| C | >75 |

EXAMPLE IX

Samples of PEGMA were mixed with five percent by weight ethylenediamine tetraacetic acid for various lengths of time at two different temperatures. After the treatment the PEGMA samples were separated from the settled solids by decantation, and anaerobic formulations were prepared, using the same ingredients in the same percentages as described in Example VIII, above. The stabilities of the various formulations were determined and found to be as follows:

| Treatment Time (Hours) | Stability (Minutes) after Treatment at | |
| --- | --- | --- |
|  | 70° F. | 150° F. |
| 1 | — | 24 |
| 4 | 25 | 35 |
| 24 | 27 | 75 |

A control sample made from untreated PEGMA had a stability of eight minutes.

EXAMPLE X

To demonstrate an alternate method of separation of the metal containing precipitate which is insoluble in the PEGMA, PEGMA was treated with ten percent by weight of a 50/50 weight solution of tetrasodium ethylenediamine tetraacetic acid in water. The mixture was vigorously agitated for one hour, after which the water layer was allowed to separate. A sample was drawn from the PEGMA layer and formulated into an anaerobic composition using the same ingredients in the same percentages described in Examples VIII, above. The stability of the formulation was found to be twenty minutes, whereas the stability of a control sample prepared from untreated PEGMA was found to be eight minutes.

EXAMPLE XI

In this Example various samples of PEGMA were treated with 300 parts per million by weight of various chelating agents. The agent was added in a three percent by weight water solution. Treatment was at 150° F. for one hour with moderate stirring. After cooling to room temperature, an insoluble precipitate was seen at the bottom of the mixture. The treated PEGMA samples then were used to prepare anaerobic formulations, using the same ingredients in the same percentages described in Example VIII, above. The stabilities of the various formulations, referenced to the chelating agent used in the treatment process, are given below.

| Chelating Agent | Stability (Minutes) |
|---|---|
| Sodium Acetylacetonate | 19 |
| Sodium Salicaldehyde | 37 |
| Sodium o-Aminophenolate | >75 |
| Disodium Pyrocatecholate | 45 |
| Sodium Quinolinolate | 36 |

Additional chelating agents were used in the same test as described in this Example, except that mixing of the chelating agent and PEGMA was continued for sixteen hours. The results of these tests are given below.

| Chelating Agent | Stability (Minutes) |
|---|---|
| Polyvinyl Alcohol | 70 |
| Disodium Dithioxamidate | 32 |
| Sodium Dimethylglyoximate | 28 |
| Sodium Diethyldithiocarbamate | >75 |

EXAMPLE XII

The exact procedure of Example XI, above, was repeated, using the one hour mixing time, except that the chelating agents were replaced with insoluble metal salt forming compounds. In each case, the presence of an insoluble precipitate was detected at the bottom of the treated PEGMA sample after cooling to room temperature. The stabilities, referenced to the treating agents used, for the resultant anaerobic compositions were as follows:

| Treating Agent | Stability (Minutes) |
|---|---|
| Sodium Thiosulfate | 18 |
| Potassium Ferricyanate | 15 |
| Sodium Citrate | 19 |
| Sodium Pyrophosphate | 28 |
| Sodium Silicate | 19 |
| Disodium Oxalate | 26 |
| Sodium Cyanide | 20 |
| Sodium Stearate | 17 |

EXAMPLE XIII

Each of the anaerobic compositions of Examples I through XII, above, the whole or a portion of which was treated and prepared in accord with the invention disclosed herein, was tested and found to be an effective anaerobic sealant. When placed on the threads of a steel bolt, and the bolt assembled with a mating nut, the sealant was found to harden in a short time to bond the nut and bolt firmly together.

Further, the anaerobic composition prepared and treated according to this invention are capable of greater cure speed since higher levels of polymerization accelerators may be used therein, compared to their prior art counterparts which have not been so treated. Particularly good results were achievable in compositions which contained less than 0.1 parts per million iron, by weight of the final anaerobic composition, and most particularly when this level was less than 0.05 parts per million.

We claim:

1. In a process for preparing an anaerobic adhesive composition, said composition comprising: a free radical polymerizable acrylate ester monomer, the polymerization of which is inhibited by oxygen; and a redox-activated latent initiator of free radical polymerization capable of polymerizing said monomer in the absence of oxygen; the step of reducing the content of metal contamination in said composition which comprises contacting said free radical polymerizable acrylate ester monomer with an insoluble chelating agent, wherein said chelating agent reacts with said metal contamination in said monomer material to form a metal-containing precipitate which is insoluble in said anaerobic adhesive composition, and wherein said anaerobic adhesive composition subsequently possesses an iron content of less than about 0.1 parts per million by weight.

2. The process of claim 1 wherein said anaerobic adhesive composition further comprises a polymerization accelerator comprising an organic sulfimide.

* * * * *